United States Patent [19]
Suzuki

[11] Patent Number: 5,463,621
[45] Date of Patent: Oct. 31, 1995

[54] FAST CONNECTION SETUP INTERFACES USING PRE-ASSIGNED VIRTUAL CHANNEL IDENTIFIERS

[75] Inventor: Hiroshi Suzuki, Tokyo, Japan

[73] Assignee: NEC Corporation, Tokyo, Japan

[21] Appl. No.: 250,454

[22] Filed: May 27, 1994

[30] Foreign Application Priority Data

May 27, 1993 [JP] Japan ..................... 5-124549

[51] Int. Cl.$^6$ ................................. H04L 12/56
[52] U.S. Cl. .................. 370/60; 370/94.1; 370/110.1
[58] Field of Search ................ 370/60, 60.1, 94.1, 370/94.2, 110.1

[56] References Cited

U.S. PATENT DOCUMENTS 5,325,356  6/1994  Lyles ............................. 370/60
5,333,131  7/1994  Tanabe et al. ................. 370/60 X Primary Examiner—Melvin Marcelo
Attorney, Agent, or Firm—Sughrue, Mion, Zinn, Macpeak & Seas

[57] ABSTRACT

In a packet-switched network in which a source station dissembles a packet into multiple cells and transmits them in sequence to a destination station, each switching system pre assigns a unique set of VCI to each outgoing line. Correspondingly respectively to incoming lines, each switching system includes line interface units for receiving normal signaling cells, a fast signaling cell and a data cell. Each interface unit includes a memory for storing the VCIs pre-assigned to the outgoing lines and a header translation table for defining relationships between a set of incoming VCIs and a corresponding set of outgoing VCIs. The interface unit assigns one of the stored VCIs to the fast signaling cell according to its destination, establishes a connection in the translation table between an incoming VCI and the assigned outgoing VC, and assigns an outgoing VCI of the established connection to the data cell according to an incoming VCI contained in the data cell. A central controller is provided for assembling the normal signaling cells into a signaling packet and assigning one of the stored VCIs to each of the normal signaling cells comprising the signaling packet. A self-routing switch provides routing of any of the cells according to a VCI assigned thereto.

7 Claims, 4 Drawing Sheets

FAST CONNECTION SETUP INTERFACES USING PRE-ASSIGNED VIRTUAL CHANNEL IDENTIFIERS

BACKGROUND OF THE INVENTION

1. Field of the Invention

The present invention relates generally to packet switching systems, and more specifically to a fast connection setup technique for a packet switched network wherein a self-routing ATM (asynchronous transfer mode) switching systems are used or an ATM-cell switched network.

2. Description of the Related Art

In a conventional packet switched network which is comprised by ATM switching systems as network nodes, a connection is first established in each node in a header translation table according to the destination of the call before data transfer begins. A central processor is responsible for establishing the connection by receiving signaling cells from a line interface, assembling them into a packet to determine its destination, and assigning a set of incoming and outgoing virtual channel identifiers (VCI) to the packet and updating the header translation table accordingly. Software based operation is employed to achieve the assignment operation. During the data transfer phase, the header translation table is accessed by each data cell for translating its incoming VCI to the corresponding outgoing VCI.

However, it takes long for the central processor to assemble the signaling cells and to assign the VCI using a software based procedure. While satisfactory for applications where the data transfer time is much longer than the call setup time, it is serious for transfer of data of bursty nature such as TCP/IP computer data, resulting in a low utilization of the network.

SUMMARY OF THE INVENTION

It is therefore an object of the present invention to provide a switching system capable of establishing a connection in a short period of time for bursty data.

The stated object is obtained by decentralizing the VCI assignment function to a plurality of line interface units.

According to a first aspect, the present invention provides a switching system connected to a plurality of incoming lines and a plurality of outgoing lines, each of the outgoing lines being pre-assigned a unique set of virtual channel identifiers (VCI). The switching system comprises a plurality of interface units corresponding respectively to the incoming lines for receiving a signaling cell and a data cell from the corresponding incoming lines. Each interface unit includes a memory for storing the VCIs pre-assigned to the outgoing lines, and a header translation table for defining relationships between a set of incoming VCIs and a corresponding set of outgoing VCIs. The interface unit assigns one of the stored VCIs to the signaling cell according to the destination of the signaling cell, updates the header translation table so that a connection is established between an incoming VCI and the assigned outgoing VCI, and assigns an outgoing VCI of the established connection to the data cell according to an incoming VCI contained in the data cell. A self-routing switch is provided for routing any of the cells according to a VCI assigned thereto.

According to a second aspect, the present invention provides a switching system for a packet network in which a source station dissembles a packet into a plurality of cells and transmits the cells in sequence to a destination station, the switching system being connected to a plurality of incoming lines and a plurality of outgoing lines, each of the outgoing lines being pre-assigned a unique set of virtual channel identifiers (VCI). The switching system comprises a plurality of interface units corresponding respectively to the incoming lines for receiving normal signaling cells, a fast signaling cell and a data cell from the corresponding incoming lines. Each interface unit includes a memory for storing the VCIs pre-assigned to the outgoing lines, and a header translation table for defining relationships between a set of incoming VCIs and a corresponding set of outgoing VCIs. The interface unit assigns one of the stored VCIs to the fast signaling cell according to its destination, updates the header translation table so that a connection is established between an incoming VCI and the assigned outgoing VC, and assigns an outgoing VCI of the established connection to the data cell according to an incoming VCI contained in the data cell. A central controller is provided for assembling the normal signalling cells into a signaling packet and assigning one of the stored VCIs to each of the normal signaling cells that comprise the signaling packet. A self-routing switch provides routing of any of the cells according to a VCI assigned thereto.

In a preferred embodiment, idle VCIs in the memory of each interface unit are monitored and if the number of such VCIs becomes smaller than a predetermined number, the number of outgoing VCIs stored in one of the memories is increased while the number of outgoing VCIs stored in the rest of the memories is decreased.

BRIEF DESCRIPTION OF THE DRAWINGS

The present invention will be described in further detail with reference to the accompanying drawings, in which.

DETAILED DESCRIPTION

Figure 1:
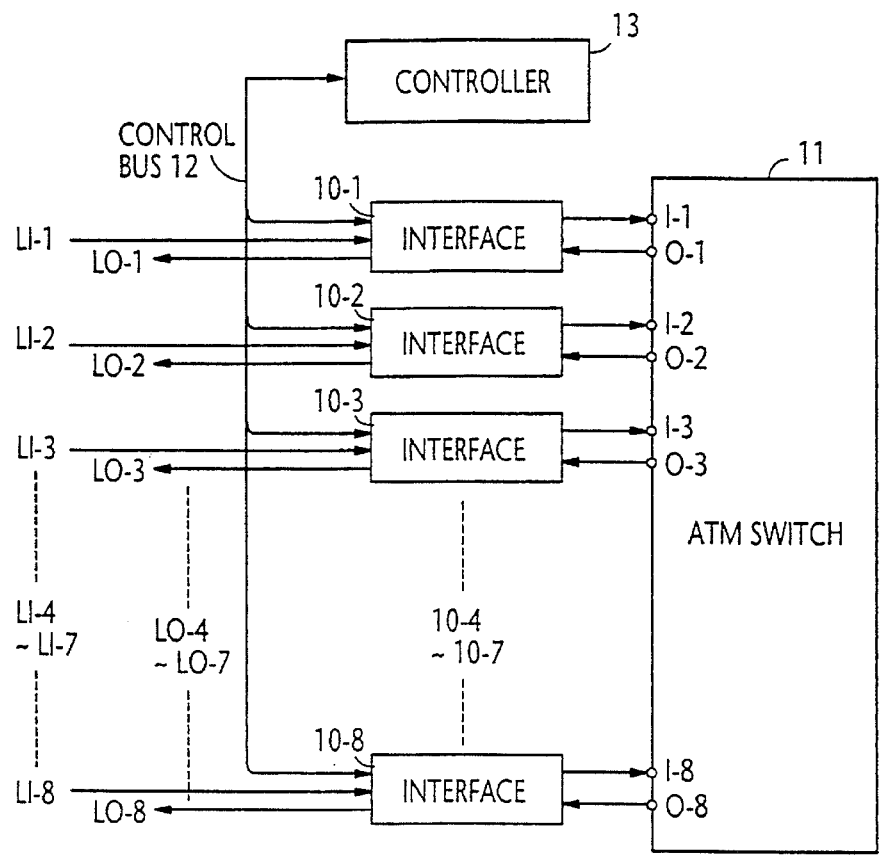
FIG. 1 is a block diagram of a network node of a packet switching network according to the present invention.

Referring now to FIG. 1, there is shown a typical node of a packet switching network according to the present invention. The network node is a packet switching system which comprises a plurality of two-way line interface units 10-1 to 10-8 which interface between incoming lines LI-1 to LI-8 and the corresponding input ports I-1 to I-8 of an asynchronous transfer mode (ATM) switch 11 and between outgoing lines LO-1 to LO-8 and the corresponding output ports O-1 to O-8 of the ATM switch. Subscriber terminals and other nodes of the network are connected through the transmission lines to corresponding two-way line interface units 10. Via a control bus 12 each of the interface units 10 is connected to a central controller 13. The source subscriber terminal initiating a call disassembles a packet (data and signaling) into a plurality of 53-byte ATM cells and transmits them in sequence into the network.

Figure 2:
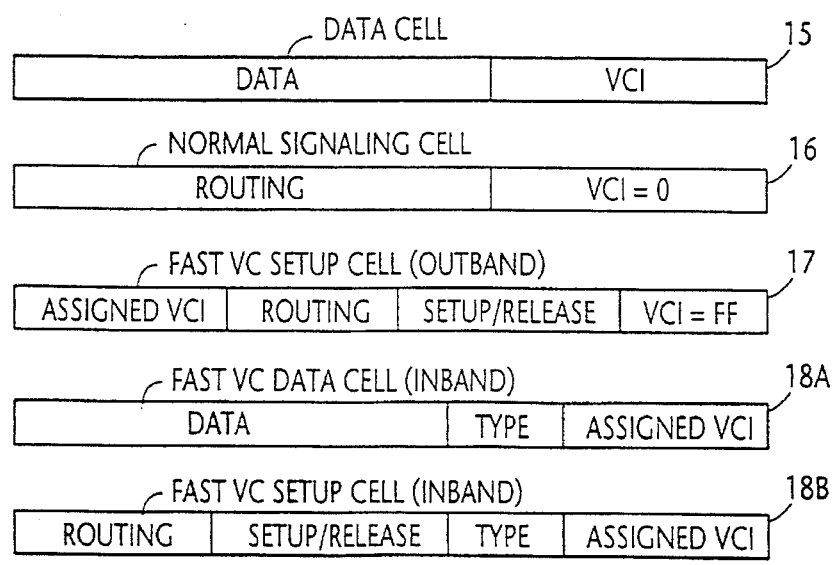
FIG. 2 is an illustration of the data structures of various cell types employed in the present invention.

From the corresponding line, each interface unit is adapted to receive 53-byte ATM cells of one of four types as shown in FIG. 2. These types of cell are a data cell 15, a normal signaling cell 16, an outband fast virtual channel (VC) setup/release cell 17 for common channel signaling, an inband fast VC data cell 18A, and an inband fast VC setup/release cell 18B for individual channel signaling. The data cell contains a VCI (virtual channel identifier) field in the cell header and a data field, and the normal signaling cell 16 contains a VCI field which is permanently set to 0 and routing information for transporting animated pictures and speech. The outband VC signaling cell 17 contains a VCI field set equal to "FF", a setup/release field, a routing field and an assigned VCI field which the subscriber determines for the first link of a connection and which is later rewritten with a new VCI at the transmit end of each successive link in order that the receive end of the link at the next node of the network is notified of the assigned VCI. Each of the inband fast VC data cell 18A and setup cell 18B contains a current VCI and a type field for indicating whether the information contained in the rest of the cell is a data field or a setup/release field. On receiving such a fast VC signaling cell 17 or 18B, each network node determines an output port (or outgoing line) number according to the routing information contained in it, assigns a VCI corresponding to the output port number, and transmits the cell to the next node after inserting that VCI into the assigned VCI field of the cell. If the fast VC cell is a data cell, the network node determines an outgoing line number according to the VCI contained in it and translates the incoming VCI to a new VCI corresponding to the outgoing line number.

Normal and fast signaling cells destined to an other network node and all data cells are launched from the header analyzer 21 into the ATM switch 11. The ATM switch 11 is a known self-routing switch which examines the VCI contained in any of the cells for routing the cells to a desired outgoing line.

Figure 3:
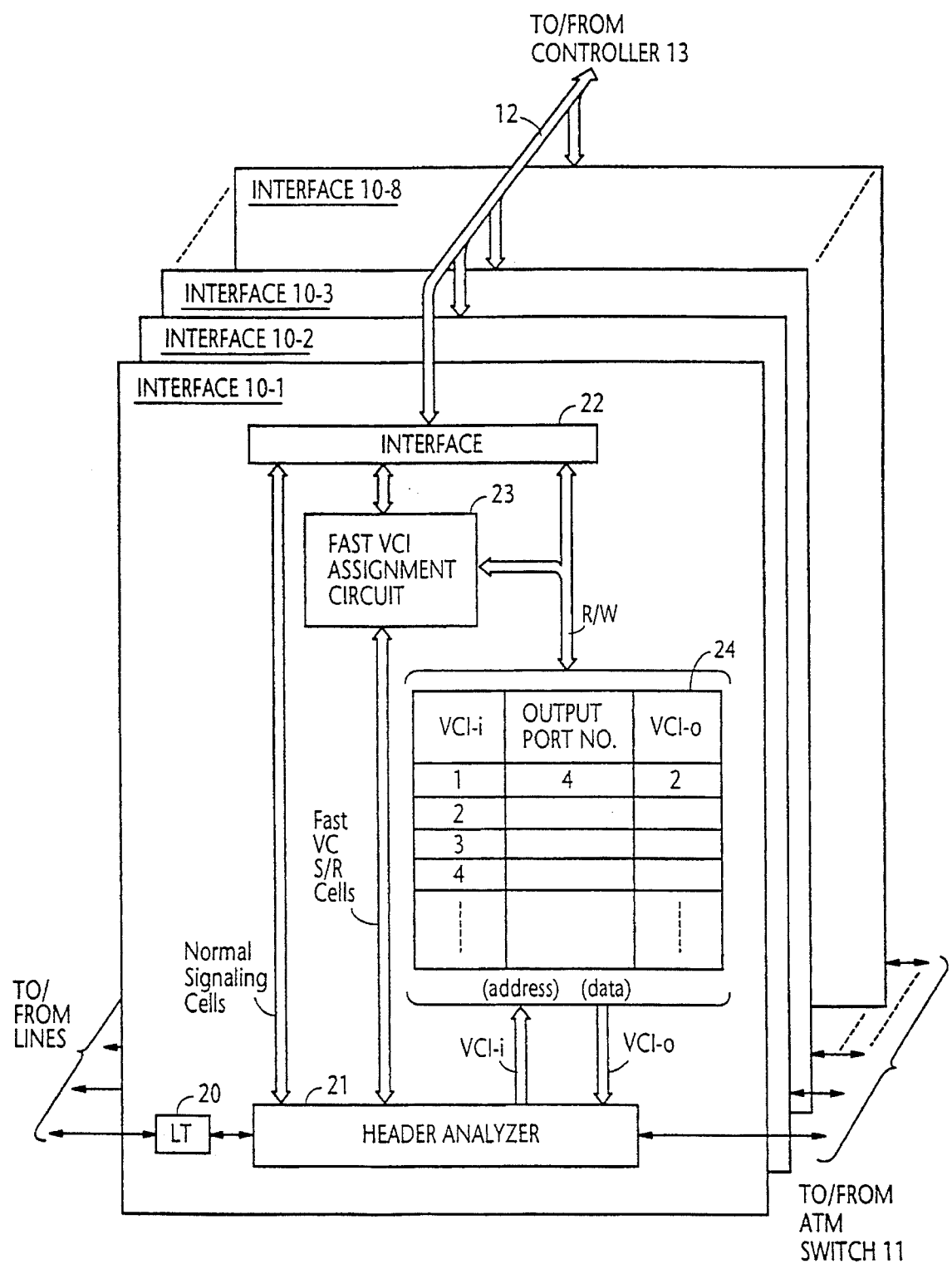
FIG. 3 is a block diagram of the details of each two-way interface unit of the network node.

As illustrated in FIG. 3, each interface unit 10 comprises a line termination unit 20 at which the line is terminated to meet the physical layer of the protocol. The output of the line termination unit is connected to a header analyzer 21 where the header of each incoming cell is extracted from the cell and analyzed to determine the type of the cell.

If the incoming cell is a normal signaling cell, it is supplied through an interface 22 to the controller 13 where it is reassembled with other normal signaling cells to reconstruct the original signaling packet, which is then analyzed to determine an output port number. By using the determined output port, the controller 13 accesses a header translation table 24 via the interface 22 to fetch a corresponding VCI and inserts it into the assigned VCI field of each of the normal signaling cells with the fetched VCI and returns the cells to the header analyzer 21, where they are launched into the ATM switch 11.

If the incoming cell is a fast VC setup/release cell 18B, the header analyzer 21 sends it to a fast VCI assignment circuit 23. When a data cell is received, the VCI contained therein is applied as an incoming VCI-i value to the address input terminal of a header translation table 24 where it is translated to an outgoing VCI-o value, and the VCI-o is returned through the data output terminal to the header analyzer 21. Header analyzer 21 rewrite the incoming VCI contained in the data cell with the translated VCI-o prior to launching it into the ATM switch 11.

Header translation table 24 is partitioned into separate fields for respectively storing a set of corresponding VCI-i values, output port numbers and VCI-o values. Read/write control signals are supplied from the fast VCI assignment circuit 23 as well as from the controller 13 via the interface 22 to the header translation table 24 to establish a connection between an incoming VCI and an outgoing VCI according the a determined output port number. The fast VCI assignment circuit 23 is also connected to the controller 13 via the interface 22.

Figure 4:
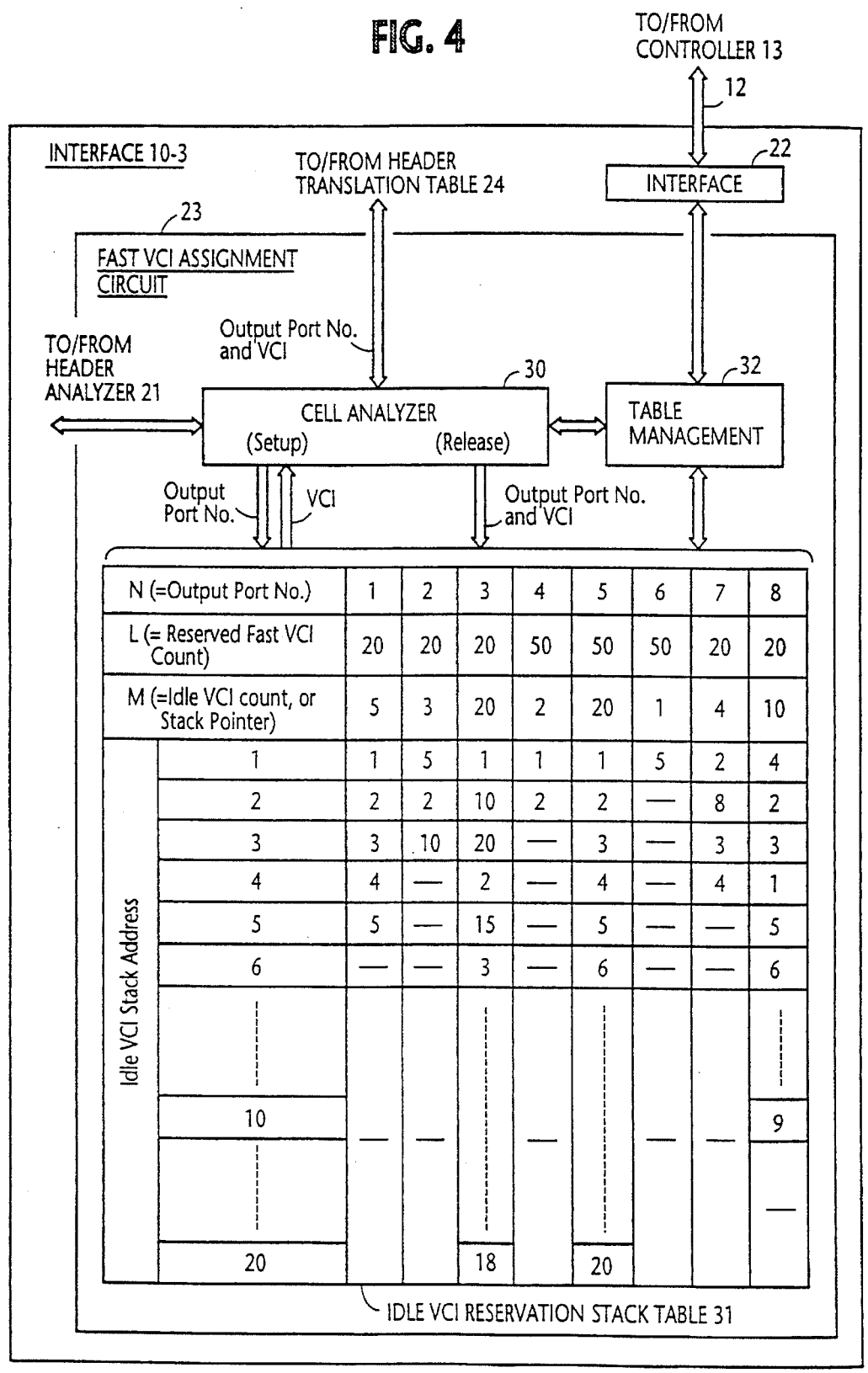
FIG. 4 is a block diagram of the details of an idle VCI reservation stack table of one of the two-way interface units.

As shown in detail in FIG. 4, the fast VCI assignment circuit 23 includes a cell analyzer 30, an idle VCI reservation stack table 31 and a table management unit 32. A fast VCI setup cell supplied from header analyzer 21 is received by the cell analyzer 30 where the routing information contained therein is analyzed to determine an output port number and supplies the output port number to the reservation stack table 31 to fetch an idle VCI corresponding to it. The fetched VCI and the output port number are returned to the header analyzer 21 where they are used to update the header translation table 24 so that a connection is established between an incoming VCI and an outgoing VCI in the table 24 corresponding to the output port number, i.e., the destination of the fast VC setup cell. If a fast VC release cell is received, the cell analyzer 30 determines the output port number of the cell from it routing information and extracts the assigned VCI from the cell and returns them to the reservation stack table 31 and updates the header translation table 24 by clearing the corresponding connection established therein.

Figure 5:
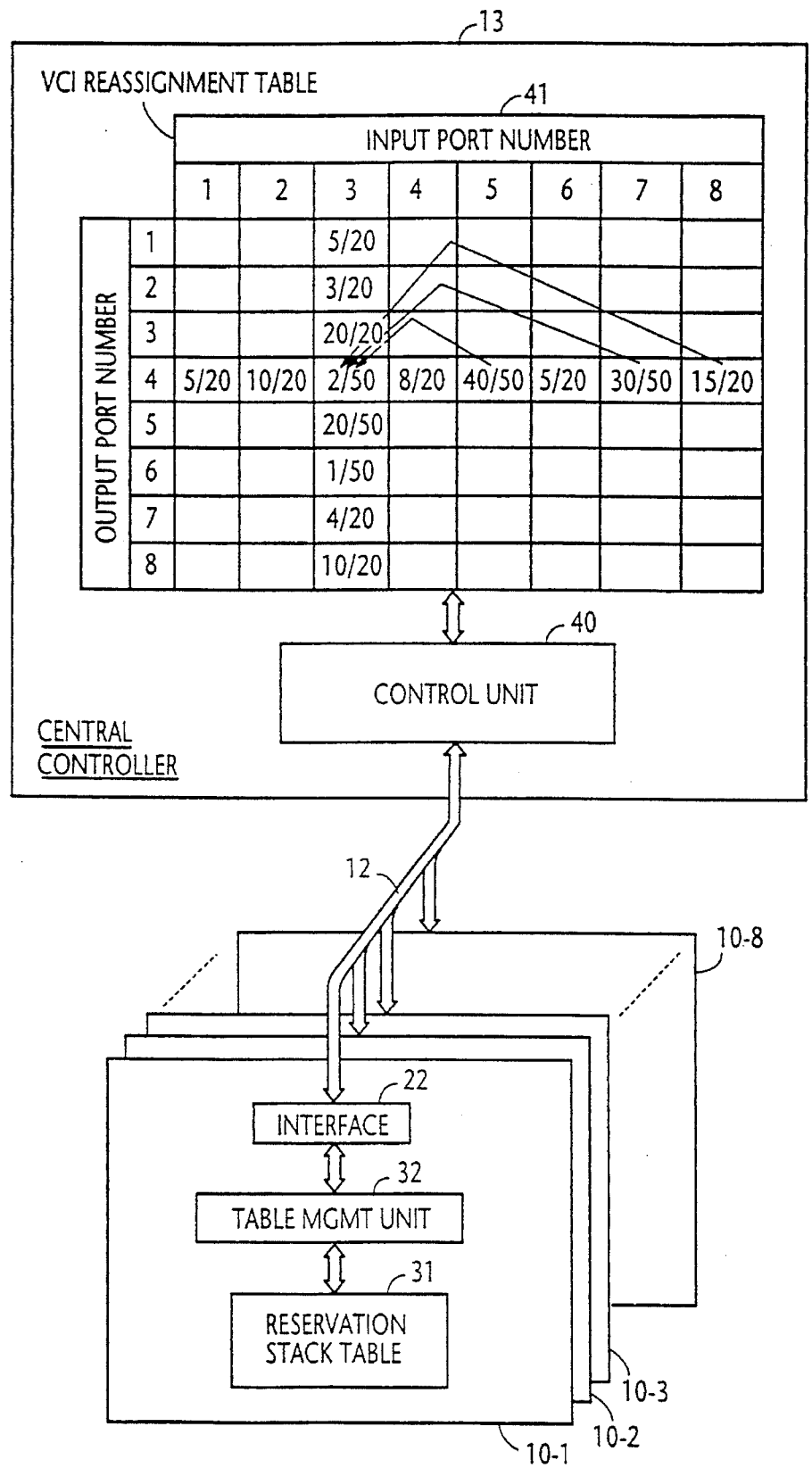
FIG. 5 is a block diagram of the details of a central controller illustrating connections to and from the two-way interface units.

As illustrated in FIG. 5, the controller 13 includes a control unit 40 which is connected via control bus 12 to the interface 22 and table management unit 32 of each two-way interface unit 10. Control unit 40 receives normal signaling cells from the interface 22 for decoding their routing information to assign a VCI and returns them with the assigned VCI in a known manner. In the controller 13 is provided a VCI reservation table 41 which is connected to the control unit 40. Controller 13 controls the reservation stack table 31 via the table management unit 32 to store the reserved fast VCI counts into columns corresponding to all output port numbers N=1 to N=8 so that, as viewed from each output port of the ATM switch (i.e., from each outgoing line LO), a unique set of idle VCIs is reserved for each input port of the ATM switch (i.e., each incoming line LI).

Returning to FIG. 4, the reservation stack table 31 is partitioned into columns 1 through 8 corresponding respectively to output port numbers N=1 through N=8 and into a plurality of rows to define a matrix for storing reserved fast VCI count values L and idle VCI counts (or stack pointers) M. As one example, the reservation stack table 32 of interface unit 10-3 is shown in which twenty (L=20) VCIs are reserved for output port numbers N=1, 2, 3, 7 and 8 and fifty VCIs are reserved for N=4, 5 and 6. It is shown that, for N=1, fifteen VCIs are currently assigned and five (M=5) idle VCIs numbered "1" to "5" are available for use. Since the available VCIs are stacked, the M value directly represents the pointer or address of a VCI which is to be assigned next. Therefore, when a fast VC setup cell is received, a new VCI is assigned. For example, if output port N=2 is selected, a VCI value=10 as indicated by the current M value=3 is assigned to the fast VC setup cell, and the M value is decremented by one. When a fast VCI release cell is received, the M value is incremented in a corresponding column and the VCI value contained in it is returned to a position of the corresponding column specified by the updated M value. Since the assignment of a VCI can be accomplished within a cell time, a high-speed VCI connection is made possible.

On the other hand, the table management unit 32 constantly monitors the idle VCI count values M for all output port numbers N and notifies the monitored count values to the controller 13.

In FIG. 5, the VCI reservation table 41 is partitioned into columns corresponding to the input ports of the ATM switch 11 and rows corresponding to the output ports of the ATM switch. In the reservation table 41 the M/L ratio values of the reservation stack table 31 of each two-way interface unit 10 are stored into the column of reservation table 41 which corresponds to the interface unit 10. As an example, the M/L ratios of all output ports of interface unit 10-3 are stored in column 3 of reassignment table 41 and the M/L ratios of the output port number N=4, for example, of all interface units 10 are stored in row 4 of the reassignment table 41. Control unit 40 compares the M/L value of a given input port of a given output port of the table 41 with some threshold value. If it falls below the threshold value, the control unit 40 compares it with the M/L values of the other input ports of the given output port. As indicated in FIG. 5, there is only two idle VCIs from input port 3 to output port 4. If the threshold value is 3, the control unit 40 compares the idle VCI count (M=2) with the M values of the other input ports to the same output port 4 and determines that there is a sufficient amount of idle VCIs for input ports 5, 7 and 8 and reassigns some of the M values of these input ports to input port 3 as indicated by the arrows. Specifically, the VCI reassignment is implemented by reading a VCI from the output port N=4 of the reservation table 31 of one of interface units 10-5, 10-7 and 10-8, decrementing its M and L values by one, and writing the VCI into the reservation table 31 of interface unit 10-3, and incrementing its M and L values by one. The process is repeated until the incremented M value reaches an appropriate value. In this manner, efficient utilization of idle VCI can be realized.

What is claimed is:

1. A switching system connected to a plurality of incoming lines and a plurality of outgoing lines, each of said outgoing lines being pre-assigned a unique set of virtual channel identifiers (VCI), the switching system comprising:

a plurality of interface means corresponding respectively to said incoming lines for receiving a signalling cell and a data cell from the corresponding incoming lines, each of the interface means comprising:

a memory for storing the VCIs pre-assigned to said outgoing lines;

a header translation table for defining relationships between a set of incoming VCIs and a corresponding set of outgoing VCIs;

means for assigning one of the stored VCIs to said signalling cell according to the destination of the signalling cell, updating said header translation table so that a connection is established between an incoming VCI and the assigned outgoing VCI, and assigning an outgoing VCI of the established connection to the data cell according to an incoming VCI contained in the data cell;

means for monitoring idle VCIs in the memory of each of said interface means;

means for increasing the number of outgoing VCIs stored in one of the memories of one of said interface means in which the number of the monitored idle VCIs becomes smaller than a predetermined value and decreasing the number of outgoing VCIs stored in the memory of the rest of said interface means in which the number of the monitored idle VCIs is not smaller than said predetermined value; and self-routing switch means for routing any of said cells according to a VCI assigned thereto.

2. A switching system as claimed in claim 1, wherein said memory is a stack memory and each of the interface means further comprises means for fetching a VCI from the stack memory corresponding to the destination of the signaling cell if a connection is to be established in the header translation table and returning a VCI to the stack memory if an existing connection established in the header translation table is to be released.

3. A switching system connected to a plurality of incoming lines and a plurality of outgoing lines, each of said outgoing lines being pre-assigned a unique set of virtual channel identifiers (VCI), the switching system comprising:

a plurality of interface means corresponding respectively to said incoming lines for receiving a signaling cell and a data cell from the corresponding incoming lines, each of the interface means comprising:

a stack memory for storing the VCIs pre-assigned to said outgoing lines;

a header translation table for defining relationships between a set of incoming VCIs and a corresponding set of outgoing VCIs;

means for assigning one of the stored VCIs to said signalling cell according to the destination of the signaling cell, updating said header translation table so that a connection is established between an incoming VCI and the assigned outgoing VCI, and assigning an outgoing VCI of the established connection to the data cell according to an incoming VCI contained in the data cell; and self-routing switch means for routing any of said cells according to a VCI assigned thereto, wherein each of the interface means further comprises means for fetching a VCI from the stack memory corresponding to the destination of the signaling cell if a connection is to be established in the header translation table and returning a VCI to the stack memory if an existing connection established in the header translation table is to be released.

4. A switching means as claimed in claim 3, further comprising:

means for monitoring idle VCIs in a memory of each of said interface means; and means for increasing the number of outgoing VCIs stored in the memory of one of said interface means in which the number of the monitored idle VCIs becomes smaller than a predetermined value and decreasing the number of outgoing VCIs in the memory of the rest of said interface means in which the number of the monitored idle VCIs is not smaller than said predetermined value.

5. A switching system for a packet network in which a source station dissembles a packet into a plurality of cells and transmits the cells in sequence to a destination station, said switching system being connected to a plurality of incoming lines and a plurality of outgoing lines, each of said outgoing lines being pre-assigned a unique set of virtual channel identifiers (VCI), the switching system comprising:

a plurality of interface means corresponding respectively to said incoming lines for receiving normal signaling cells, a fast signaling cell and a data cell from the corresponding incoming lines, each of the interface means comprising:

a memory for storing the VCIs pre-assigned to said outgoing lines;

a header translation table for defining relationships between a set of incoming VCIs and a corresponding set of outgoing VCIs;

means for assigning one of the stored VCIs to said fast signaling cell according to the destination of the fast signaling cell, updating said header translation table so that a connection is established between an incoming VCI and the assigned outgoing VC, and assigning an outgoing VCI of the established connection to the data cell according to an incoming VCI contained in the data cell;

control means for assembling the normal signaling cells into a signaling packet and assigning one of the stored VCIs to each of the normal signaling cells that comprise the signaling packet; and self-routing switch means for routing any of said cells according to a VCI assigned thereto.

6. A switching system as claimed in claim 5, further comprising:

means for monitoring idle VCIs in a memory of each of said interface means; and means for increasing the number of outgoing VCIs stored in the memory of one of said interface means in which the number of the monitored idle VCIs becomes smaller than a predetermined value and decreasing the number of outgoing VCIs stored in the memory of the rest of said interface means in which the number of the monitored idle VCIs is not smaller than said predetermined value.

7. A switching system as claimed in claim 5, wherein said memory is a stack memory, and wherein each of the interface means comprises means for fetching a VCI from the stack memory corresponding to the destination of the fast signaling cell if a connection is to be established in said translation table and returning a VCI to the stack memory if an existing connection established in said translation table is to be released.

* * * * *